United States Patent [19]

Forest

[11] 4,149,298
[45] Apr. 17, 1979

[54] TIE MEMBER FOR MOUNTING CABLE ON A FENCE

[75] Inventor: Lawrence J. Forest, Palo Alto, Calif.

[73] Assignee: GTE Sylvania Incorporated, Mountain View, Calif.

[21] Appl. No.: 801,804

[22] Filed: May 31, 1977

[51] Int. Cl.² ............................................. B65D 63/00
[52] U.S. Cl. .............................. 24/16 PB; 248/74 PB
[58] Field of Search ........... 24/16 PB, 17 AP, 73 PF, 24/73 PB; 248/74 PB

[56] References Cited

U.S. PATENT DOCUMENTS

| | | | |
|---|---|---|---|
| 3,213,559 | 10/1965 | Matich | 24/16 PB |
| 3,341,651 | 9/1967 | Odegaard | 248/74 PB |
| 3,529,795 | 9/1970 | Niel | 24/16 PB |
| 3,981,048 | 9/1976 | Moody et al. | 248/74 PB |

FOREIGN PATENT DOCUMENTS 1229921  3/1960  France ................................. 24/16 PB

*Primary Examiner*—Henry S. Jaudon
*Attorney, Agent, or Firm*—John F. Lawler

[57] ABSTRACT

A plastic tie member for mounting a transducer cable on a chain link fence comprises a flexible strap having two spaced apertured heads at one end arranged, when the member is tied, to snugly clamp the cable to a fence strand while maintaining them in a physically spaced relation. The effective space between the heads is substantially the same as the circumference of the cable so as to form a pocket, when the member is in the tied position, in which the cable snugly gripped with a predetermined constant force independent of the clamping force on the fence strand. This insures against excessive clamping forces on the cable, prevents damage to cable from burrs and the like on the fence strands, and maintains an efficient vibration-sensitive coupling between cable and fence.

1 Claim, 6 Drawing Figures

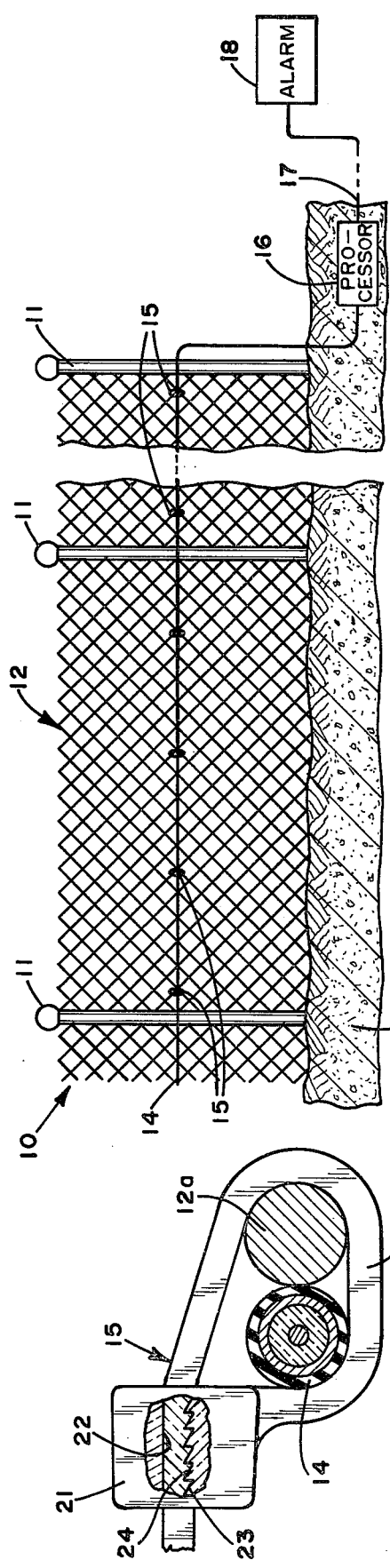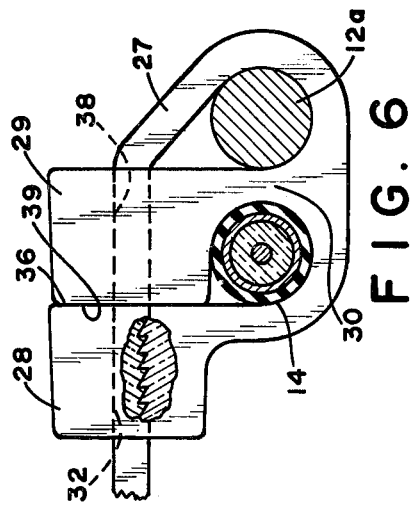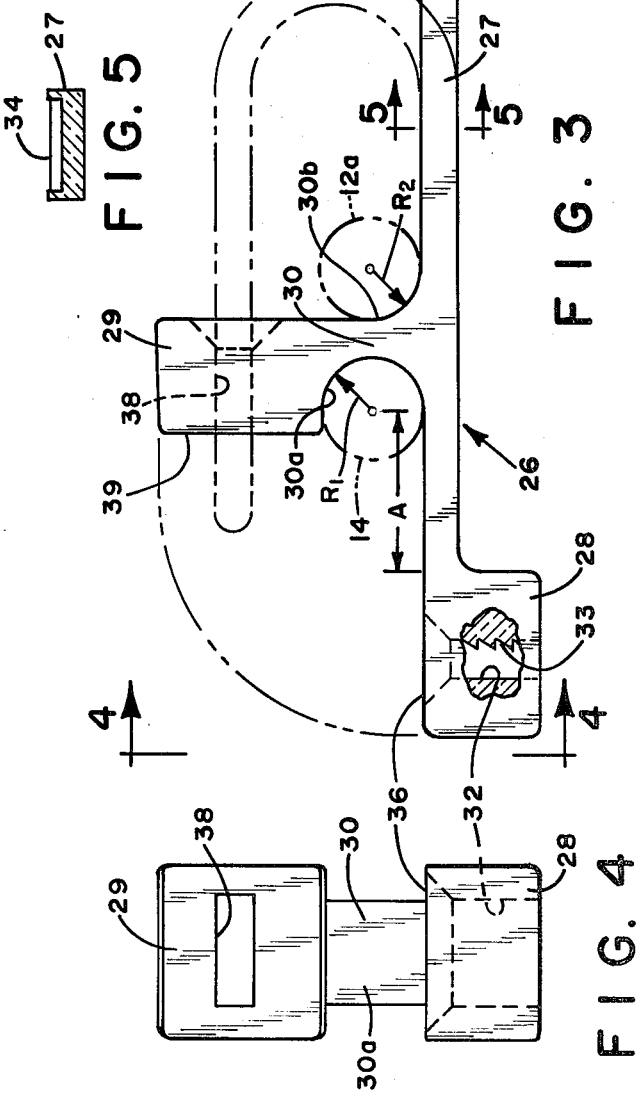

TIE MEMBER FOR MOUNTING CABLE ON A FENCE

BACKGROUND OF THE INVENTION

This invention relates to tie members and more particularly to a tie member for mounting a transducer cable on a chain link fence or the like.

The fence protection system described in U.S. Pat. No. 3,763,482 utilizes a coaxial transducer cable as a line sensor connected to the fence fabric at longitudinally spaced points by fasteners or tie members. In addition to supporting the cable transducer, these tie members provide an efficient mechanical coupling between the fence and transducer so that intruder generated vibrations in the fence are transmitted to the cable which converts them into electrical signals detectable by signal processing circuits. The cable is readily installed by unskilled installers using conventional clamping tools.

The problem with this installation technique is that the coaxial cable is clamped directly against the fence fabric strands which are manufactured with varying degrees of roughness depending on the galvanizing process used. The burrs and rough spots on the strands often puncture or tear the outer covering of the cable, expose the interior to the elements and generally impair its capability to detect signals. In some instances in the field, such burrs have been found to have penetrated the cable sufficiently deeply to short the outer and inner conductors. On the other hand, if the cable transducer is not sufficiently tightly clamped to the fence, the efficiency of vibration coupling between fence and transducer is reduced and spurious signals may be generated by cable because of the play between the cable and fence.

In addition to damage from burrs, clamping of the cable with conventional tie members may result in excessive clamping forces being applied so as to cause indentation of the cable at the tie point. This tends to reduce the spacing between outer and inner conductors so as to impair cable sensitivity. The optimum clamping force for efficient operation of the transducer cable is not readily achieved with prior art tie members.

This invention is directed to an improved tie member which overcomes these problems.

OBJECTS AND SUMMARY OF THE INVENTION

A general object of this invention is the provision of a cable tie member which physically spaces the cable from the support element to which it is connected.

Another object is the provision of a cable tie member in which the clamping force it exerts on the cable is independent of the force it exerts on the associated support.

A further object is the provision of a cable tie member which prevents the application of excessive clamping forces to the cable being clamped.

Another object is the provision of a cable tie member which grips the cable snugly and secures it to a support without adversely affecting the electrical characteristics of the cable.

Still another object is the provision of a tie member for securing a transducer cable to chain link fence fabric at longitudinally spaced points throughout the length of the cable with a uniform clamping force at each connecting point without the use of special tools.

These and other objects of the invention are achieved with a tie member having two heads at one end of a flexible strap and spaced apart so as to define a cable receiving and gripping loop or pocket of fixed transverse dimension when the heads are abutting each other. The other end of the strap forms a second independent variably-sized loop around a support and locks the heads together in abutting relationship so as to mechanically connect and physically isolate the cable and the support.

BRIEF DESCRIPTION OF DRAWINGS

FIG. 1 is a side elevation of a fence protected by an intrusion detection system having a transducer cable connected to the fence fabric by tie members of the type to which this invention pertains;

FIG. 2 is a side elevation of a prior art tie member in the operative or tied position connecting a coaxial transducer cable to a strand of the fence fabric;

FIG. 3 is a side elevation of a tie member embodying this invention;

FIG. 4 is an end view of the tie member taken along line 4—4 of FIG. 3;

FIG. 5 is a section of the strap taken on line 5—5 of FIG. 3; and

FIG. 6 is a view similar to FIG. 2 showing the tie member of FIG. 3 in the tied position around the cable and the fence strand.

DESCRIPTION OF PREFERRED EMBODIMENTS

Referring now to the drawings, FIG. 1 shows a chain link fence 10 comprising vertical posts 11 secured in the ground G and supporting wire mesh fencing fabric 12. A line sensor 14 is secured by tie members 15 to fencing material 12 throughout the entire length of the fence. Sensor 14 preferably is a coaxial transducer cable and is connected to a signal processor 16 preferably buried adjacent to the fence, and an output line 17 from the processor transmits signals generated by cable 14 to a remote control and alarm station 18 preferably by an underground route for security reasons.

The above type of intrusion detection system using clamping rings for tie members 15 is described in the foregoing U.S. Pat. No. 3,763,482. Vibrations generated in fence fabric 12 by an intruder or the like are coupled to transducer cable 14 which converts them into electrical signals which are propagated by the cable to processor 16 and ultimately to remote station 18.

Another form of prior art tie member 15 is shown in FIG. 2. Member 15 comprises a flexible plastic strap 20 having a head 21 at one end formed with an aperture or opening 22 having a cross-sectional shape the same as but slightly larger than strap 20. One surface of opening 22 has serrations 23 adapted to engage similar serrations 24 on strap 20. Such a tie member, when wrapped around both strand 12a of fencing fabric 12 material and cable 14 and pulled through opening 22 as shown, tightly presses the cable against the strand to form an effective vibration-sensitive coupling. The difficulty is, however, that rough spots and burrs on strand 12a tend to penetrate the outer covering of the coaxial cable causing damage to and ultimate deterioration of the cable as a transducer. In addition, without the use of a special tool, there is no practicable way to limit the force applied against cable 14 except the "feel" of the installer which may vary from person to person. The prior art tie member shown in FIG. 2 is of the type described in U.S. Pat. Nos. 3,022,557 and 3,186,047.

In accordance with this invention, a tie member 26, see FIG. 3, comprises an elongated flexible strap 27 having a first integrally connected head 28 at one end and a second head 29 spaced closely to the first head and connected to the strap by a neck 30. Head 28 corresponds to head 21 of member 15 in FIG. 2 and likewise has a generally rectangular opening 32 with serrations 33 for engaging and locking corresponding serrations 34 on strap 27. The front, upper as viewed surface 36 of head 28 is flat and is chambered at opening 32 to facilitate entry of the strap.

Head 29 has the same size and shape as head 28 and is also formed with an opening 38 having cross sectional dimensions slightly larger than the corresponding dimensions of strap 20. The rear, left as viewed, surface 39 of head 29 is flat and provides an abutment for surface 36 of head 28. Strap 20 is adapted to be looped upwardly and to the left as shown through opening 38 in head 29 as indicated in broken lines in FIG. 3 to provide a loop of variable cross-sectional dimensions for engaging a support such as fence strand 12a. Opening 36 in head 29 has smooth internal surfaces with no locking mechanism for engaging the serrations on strap 20. Neck surface 30b opposite surface 30a preferably is rounded as shown and may have a radius $R_2$ equal to one half the diameter of strand 12a if desired to better match the tie member to this support.

The space A between head 28 and the juncture of neck 30 with the strap and the radius $R_1$ of cylindrical neck surface 30a are both predetermined and critical to achievement of the objectives of the invention. This spacing A and the length of surface 30a together are substantially the same as the circumferance of cable 14, the diameter of which is equal to $2R_1$. With such tie member dimensions, cable 14 is engageable with a snug but nonconstricting gripping force when head 28 is pivoted upwardly along the path of the broken line arc in FIG. 3 until its front face 36 abuts rear face 39 of head 29 as shown in FIG. 6.

Tie member 26 connects cable 14 to a chain link fence strand 12a as shown in FIG. 6. This may be accomplished by initially looping strap 20 around fence strand 12a and through opening 38 in head 29. Cable 14 is then placed against the cylindrical surface 30a of neck 30 and the strap is pulled through opening 32 in head 28 until surfaces 36 and 39 of the heads abut, the interlocking serrations of head 28 and the strap serving to retain these parts in a permanently locked position. As such, cable 14 and fence strand 12a are separated by neck 30 which nevertheless is capable of transmitting vibrations from the cable. Since cable is snugly held within the cylindrically shaped pocket between the heads, it is sensitive to vibrations generated in the fencing material.

While the tie member embodying this invention has been described above in conjunction with a fence-mounted intrusion detection system, it also has merit and advantage for other purposes, such as mounting cables in aircraft, automobiles and other vehicles wherein vibrations and relative movement between the cable and the associated support may tend to unduly wear or damage the cable insulation. Another application is for insulated wires that are mounted outdoors on rough supports so as to be exposed to winds which produce relative movement between wires and support. In these and similar applications the isolation of the wire from the support by the tie member in addition to the constant gripping force it provides insures against damage to the wire or change in its electrical characteristics due to excessive clamping forces.

What is claimed is:

1. A tie member for mounting cable means on a support comprising an elongated strap having first and second ends, a first block connected to said first end of the strap, a second block connected to said strap between said ends thereof, each of said blocks having an opening adapted to receive said second end of the strap, said first block when positioned in abutment with said second block and with said openings in alignment defining a pocket having a surface with a length substantially the same as the circumference of said cable means whereby the latter may be snugly gripped within said pocket, said second block extending perpendicularly from one longitudinal surface of said strap and including a neck connecting said second block to said strap, said neck having a semi-cylindrical surface facing said first end and constituting part of said surface of said pocket, said second end of said strap being insertable through said block openings and forming with said second block a loop having variable cross sectional dimensions independent of corresponding dimensions of said pocket whereby said support may be engaged.

* * * * *